April 9, 1940. L. A. PARNELL 2,196,938
DEAD END CLAMP
Filed Oct. 24, 1939
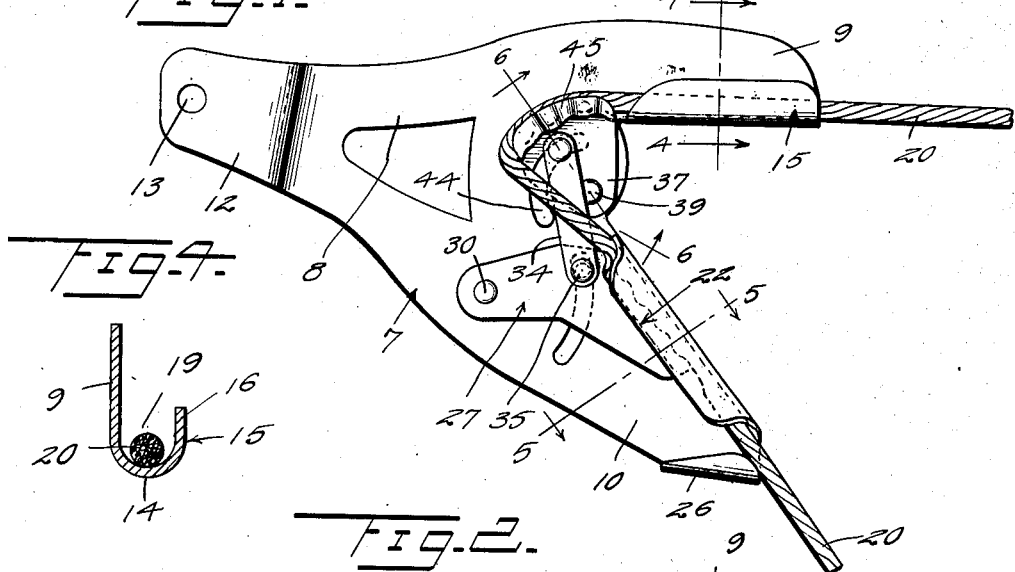
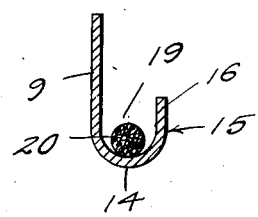
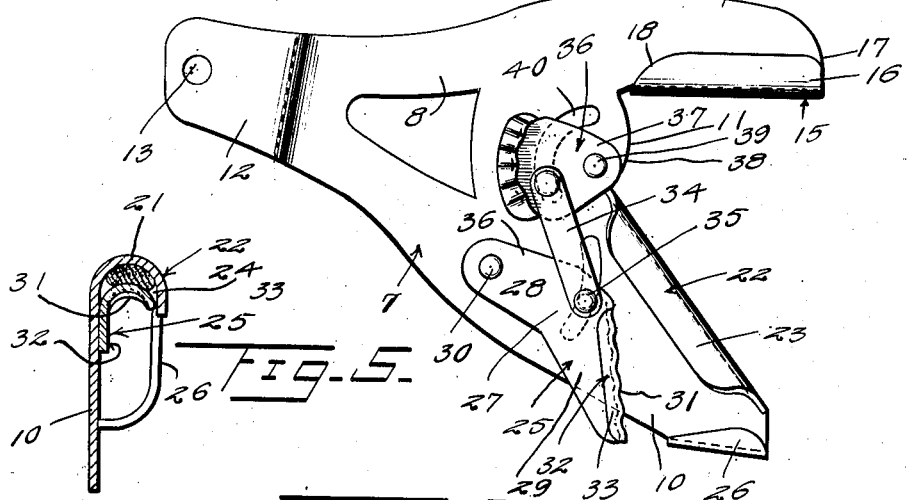
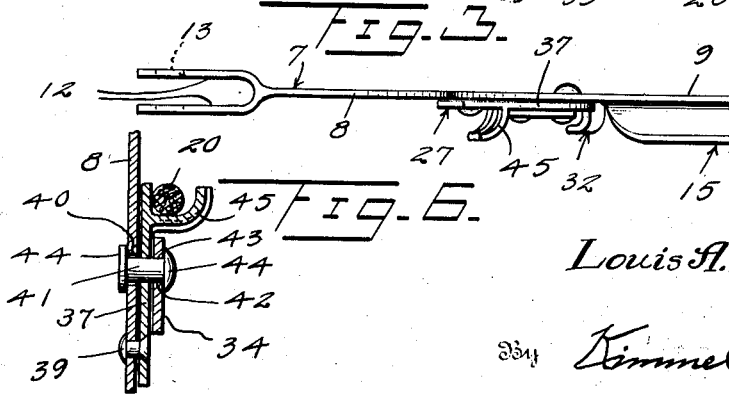
Inventor
Louis A. Parnell
By Kimmel & Crowell
Attorneys Patented Apr. 9, 1940

2,196,938

UNITED STATES PATENT OFFICE 2,196,938

DEAD END CLAMP

Louis A. Parnell, Stillwater, Minn.

Application October 24, 1939, Serial No. 301,079

10 Claims. (Cl. 24—134)

This invention relates to a fastener designed primarily for use on power or telephone poles for connecting the dead end of a wire thereto, but it is to be understood that a fastener, in accordance with this invention, is for employment in connection with any form of support therefor for which it may be applicable, and further although designed primarily for use in connection for fastening the dead end of a wire yet it is capable of being used for anchoring the ends of ropes, cables and chains with any suitable support.

The invention aims to provide, in a manner as hereinafter set forth, a fastener including correlated means, one operated from the other by the weight of the wire to clamp the latter with the tighter the pull on the wire the more firmly the latter is clamped.

The invention further aims to provide, in a manner as hereinafter set forth, a fastener for attachment to a power or telephone pole and having means for effectively clamping the dead end of a wire with the pole.

The invention further aims to provide, in a manner as hereinafter set forth, a fastener of the class referred to for attachment to a support for securely connecting an end of a wire, cable, rope or other flexible member to the support and embodying means whereby the weight of the wire acts to cause said means to clamp the wire with the tighter the pull on the wire the more firmly the latter is clamped.

The invention further aims to provide, a fastener for the purpose set forth which is comparatively simple in its construction and arrangement, strong, durable, compact, automatic in its fastening action, thoroughly efficient in its use, readily installed with respect to power and telephone poles or other support therefor, and comparatively inexpensive to manufacture.

Embodying the aims aforesaid and others which may hereinafter appear, the invention consists of the novel construction, combination and arrangement of parts as will be more specifically referred to and illustrated in the accompanying drawing, wherein is shown an embodiment of the invention, but it is to be understood that changes, variations and modifications may be resorted to which fall within the scope of the invention as claimed.

In the drawing:

Figure 1 is a side elevation of the fastener as applied to a wire and with the correlated shiftable parts of the fastener in clamping relation with the wire, Figure 2 is a screw similar to Figure 1 with the correlated shiftable parts of the fastener in non-active position and with the wire not shown, Figure 3 is a top plan view of the fastener, and Figures 4, 5 and 6 are respectively sections on lines 4—4, 5—5 and 6—6 Figure 1.

The fastener includes a substantially Y-shaped body 7 preferably constructed from sheet metal of the desired gage, length and width. The body 7 comprises a stem 8 and a pair of spaced arms 9, 10. The stem 8 is of flared contour, merges at its forward end into the inner ends of the arms 9, 10, has a forward edge portion 11 of curved contour between the said inner ends and is formed with an offset bifurcated rear terminal portion 12 provided with aligned openings 13. The arm 9 is horizontally disposed and of substantially uniform width. The arm 10 is tapered and of greater length than and extends at an obtuse angle to the arm 9.

Formed integral with the major portion of the inner edge of the arm 9 is the lower curved portion 14 of a flange 15. The latter includes an upstanding outer portion 16 which is disposed in parallel spaced relation with respect to the lower part of the front face of the arm 9. The outer end edge of flange 15 is flush with the outer end edge of arm 9. The flange portion 16 has its forward upper corner rounded, as at 17 and its rear end edge curved, as at 18. The flange 15 correlates with the arm 9 to provide a guide channel 19 for the wire. The flange 15 also constitutes a retainer for a stretch of the wire 20. The curved portion 14 constitutes what may be termed a combined support and abutment for the wire and extends upwardly at a slight inclination from its rear to its front end.

Formed integral with the inner lengthwise edge of the arm 10 is the inner curved portion 21 of a flange 22. The portion 21 is differently disposed with respect to the portion 14 of the flange 15, that is to say the said portion 14 opens upwardly whereby the portion 21 opens rearwardly. The flange 22 includes a rearwardly directed outer portion 23 disposed in parallel spaced relation with respect to the front face of arm 10. The flange 22 is disposed at an inclination corresponding to the inclination of and is of the same length as the length of the inner edge of the arm 10. The ends of flange portion 23 are disposed at opposite inward inclinations. The flange 22 correlates with the arm to provide a channel 24 for receiving another stretch of the wire 20 and the clamping part of a shiftable wire clamping member 25 to be more fully referred to. The flange portion 21 constitutes what may be termed a stationary clamp member for correlation with the shiftable clamping member 25. The outer lengthwise edge of the arm 10 at the outer terminal portion thereof is formed integral with the lower portion of an upstanding offset flange 26 disposed in spaced relation to the forward end of flange 22 and which constitutes a retainer for the wire to hold the latter within the outer end portion of the channel 24. The top of the flange 26 at its outer end portion is disposed in aligned spaced relation with respect to the outer end edge of the flange portion 23.

The member 25 is formed from a length of sheet metal and it comprises an angle shaped body 27 formed of a pair of oppositely extending inclined arms 28, 29. The arm 28 is pivoted, as at 30 to the stem 8. The pivot is arranged forward of the transverse median and below the lengthwise median of the stem 8 and in proximity to the point of mergence of the inner end of the arm 10 with stem 8. The member 25 extends upon the arm 10 and when in inactive position has its arm 29 disposed in depending relation with respect to the forward end of arm 28 and the outer lengthwise edge of arm 10. Formed integral with the inner end edge of the arm 29 is the inner side of the curved corrugated forward portion 31 of a flange 32. The latter is formed with a rearwardly extending portion 33 disposed in parallel spaced relation with respect to the outer face of the arm 29 and which at its forward side merges into the outer side of flange portion 31. The flange 32 constitutes the clamping part of the clamping member 25 and correlates with flange portion 21 for clamping the wire in the channel 24.

There is correlated with the clamping member 25 an actuable shifting link 34 therefor. The link 34 is pivotally and slidably connected, at the inner or lower end thereof, as at 35 to the body 27 of member 25 substantially at the point of mergence of the arms 28, 29 and in proximity to upper edge 36 of said member 25. When the latter is in inactive position, the link 34 extends rearwardly at an inclination from its inner or lower end throughout with respect to member 25. The inner or lower portion of link 34 is arranged on the outer face of member 35 rearwardly of flange 22.

There is correlated with the link 34 for the purpose of actuating it to provide for the shifting of member 25 to coact with the flange portion 21 to clamp the wire in the groove 24 a horizontally disposed cam element 36 operated by the weight of the wire on the pulling of the latter through the groove 19. The element 36 comprises a substantially semi-ovoidal shaped plate 37 of sheet metal positioned against the outer face of the stem 8 and having its smallest or forward end arranged between the inner ends of the arms 9, 10. The plate 37 is pivotally connected, in proximity to its forward end edge 38 to the stem 8, as at 39. The plate 37 is slidably connected to a guide slot 40 of arcuate form provided in the stem 8 and for such purpose a stud 41 for correlation with the slot 40 is provided. The stud 41 extends through an opening 42 in plate 37 and through slot 40. The stud 41 also extends through an opening 43 in the link 34 and constitutes a pivot for the upper or outer end of said link. The ends of the stud 41 are upset, as at 44 for connecting it to the stem 8, plate 37 and link 34. The rear end edge of plate 37 is formed with an outwardly directed corrugated flange 45 of arcuate contour and of angle-shape in cross section. The rear end edge of plate 37 is of greater length than the forward end edge thereof. The slot 40 is arranged in proximity to the edge portion 11 of stem 8.

The apertured bifurcated rear end portion 12 of the stem 8 is formed to straddle a support, not shown, such as a power line or telephone pole and the openings 13 in the portion 12 is for the passage of a suitable holdfast means, not shown for securing the fastener to the support.

The operation of the fastener is as follows: The wire to be held in position is passed through the channel or groove 19, around the flange 45 and into and through the channel 24 between the flange portions 21, 31, the weight of the wire pulls the cam 36 in a direction to shift it to the position shown by Figure 1 whereby the link 34 will be carried therewith and which in turn will shift the member 35 to the position shown in Figure 1, whereby the flange portions 21, 31 will clamp the wire to the arm 10. The tighter the pull the more firmly the wire will be clamped to arm 10.

What I claim is:

1. In a fastener for the purpose set forth a stem, a pair of spaced oppositely extending arms at the outer end of the stem, one of said arms being provided with means on its inner edge to constitute a combined guide channel, support and abutment for a stretch of the object to be fastened, the other of said arms provided with means at its inner edge to constitute a combined receiving channel and stationary clamping part for another stretch of the object to be fastened, a shiftable clamping member pivotally connected to said stem and including a clamping part for correlation with the said other part for clamping said object to the said other arm, an actuatable link pivoted at one end to and for moving said member to and from active position, a cam operated from the object to be fastened on a pull on the latter for actuating said link to move said member to active position, said cam being pivotally and slidably connected to said stem, and said link being pivotally connected at its other end to and bodily movable with the cam.

2. The invention as set forth by claim 1 having the pivot for the cam arranged in proximity to one end thereof and the other end of the cam being formed with an outwardly directed offset flange of arcuate form over which the object slides during the fastening of the latter, said flange having a part thereof opposing and spaced from said stem.

3. The invention as set forth by claim 1 having the slidable connection between the cam and stem being in the form of an arcuate slot formed in the stem and a stud extending through the link, cam and slot and bearing against the stem and link, said stud constituting a pivot for the said other end of the link.

4. The invention as set forth by claim 1 having the said clamping member in the form of a pair of oppositely extending inclined arms, one of said arms of said member having connected thereto the pivot connecting said member to the stem, and the other of said arms of said member being provided with the shiftable clamping part which correlates with said stationary clamping part.

5. In a fastener for the purpose set forth, a stem for anchoring to a support, a substantially horizontally disposed upper arm, a lower arm disposed at an obtuse angle with respect to said upper arm, the inner ends of said arms merging into the outer end of said stem, the inner edge of said upper arm being formed with offset means correlating with said upper arm to provide a combined guide channel, support and abutment for a stretch of the object to be fastened, the inner edge of said lower arm being formed with offset means to provide a combined receiving channel and stationary clamping part for receiving another stretch of said object, a shiftable clamping member pivotally connecting at its inner end to said stem and including a shiftable clamping part spaced from its pivot for correlation with said stationary clamping part for clamping said body to the lower arm, shifting means for and pivoted to said member between its pivot and clamping part of said member, and a cam structure pivoted to said stem and shifting means, slidably connected to said stem and shifted on its pivot by said object for actuating said shifting means to provide for the coaction of the said parts to clamp the object to the lower arm.

6. In a fastener for the purpose set forth, a substantially flat body adapted to be anchored to a support, said body being formed with offset means to provide in connection therewith a forwardly directed horizontally disposed combined guide channel, support and abutment element for a stretch of the object to be fastened, said body being formed with offset means spaced from said guide channel lengthwise thereof opening upwardly and having its ends permanently open, said other means to provide a forwardly directed downwardly inclined combined receiving channel and stationary clamping element for another stretch of said object, said receiving channel opening lengthwise thereof rearwardly and having its ends permanently open, a shiftable clamping member pivotally connected to said body for correlation with said clamping element for clamping the object to said body, a shifting element for and connected to said member, a shiftable cam engaged by and operated from the object on pulling the latter for actuating said shifting means to provide for the coacting of said stationary clamping element and member to clamp the object to said body, and said cam being pivotally and slidably connected to said body and pivotally connected to said shifting means.

7. The invention as set forth by claim 6 having the pivot for said cam adjacent one end and the slidable connection between the cam and body adjacent the other end of the cam and with said slidable connection attached to said shifting means.

8. The invention as set forth by claim 6 having one end of the cam formed with an offset transversely corrugated flange of arcuate contour engaged by the object, said flange being of substantially L-shape in transverse section.

9. In a fastener for the purpose set forth, a substantially flat body adapted to be anchored to a support, said body being formed with offset means to provide in connection therewith a combined guide channel, support and abutment element for a stretch of the object to be fastened, said channel opening lengthwise thereof upwardly and having its ends permanently open, said body being formed with offset means spaced from said other means to provide an inclined combined receiving channel and stationary clamping element for another stretch of said object, said receiving channel opening lengthwise thereof rearwardly and having the ends permanently open, a link, a pair of oppositely shiftable spaced members, one arranged above the other, shiftable in opposite directions in unison and pivotally connected to said link, the said pair of members being slidably connected to said body and operated by the object on a pull on the upper member for operating the lower member to coact with the combined object receiving channel and stationary clamping element for clamping the object to the latter, and the upper one of the said pair of members being provided at one end with an offset flange engageable by the object for operating the said upper member.

10. In a fastener for the purpose set forth, a substantially flat body adapted to be anchored to a support, said body being formed with offset means to provide in connection therewith a combined guide channel, support and abutment element for a stretch of the object to be fastened, said body being formed with offset means spaced from said other means to provide a combined receiving channel and stationary clamping element for another stretch of said object, a link, a pair of oppositely shiftable spaced members, one arranged above the other, shiftable in opposite directions in unison and pivotally connected to said link, the said pair of members being slidably connected to said body and operated by the object on a pull on the upper member for operating the lower member to coact with the combined object receiving channel and stationary clamping element for clamping the object to the latter, the upper one of the said pair of members being provided at one end with an offset flange engageable by the object for operating the said upper member, said flange being corrugated transversely, and the lower one of said members having an offset flange formed with a transversely corrugated clamping part for correlation with the combined object receiving channel and stationary clamping element.

LOUIS A. PARNELL.